Figure 20:
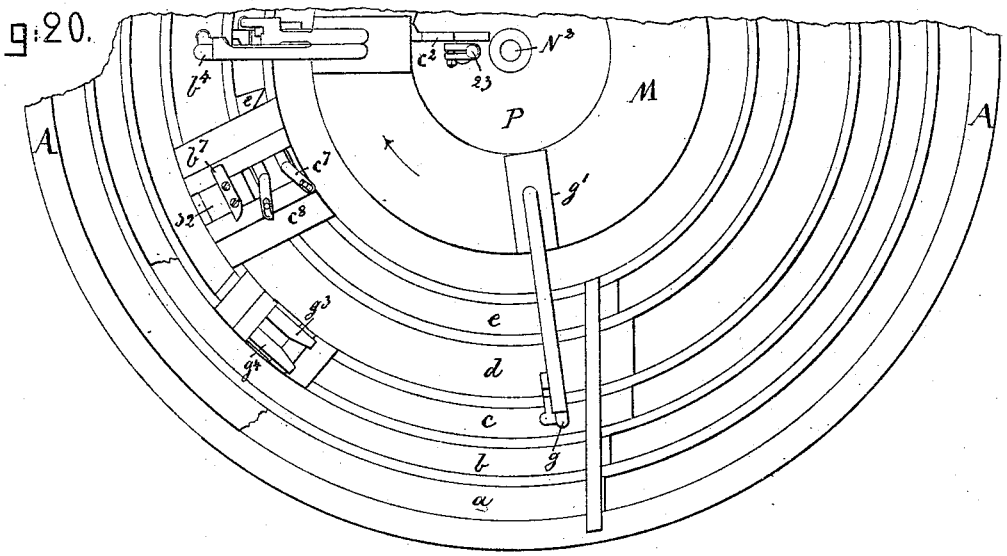

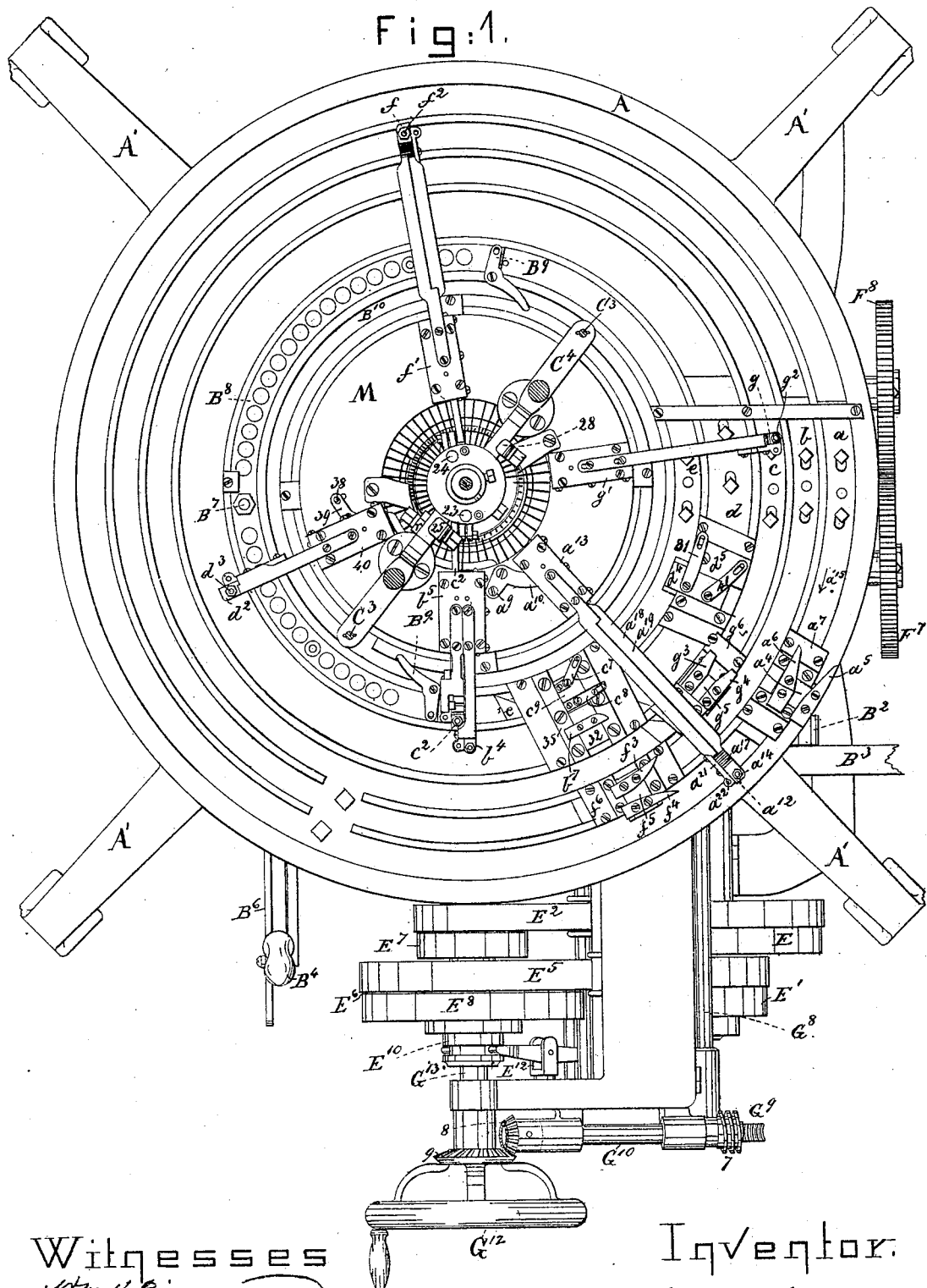

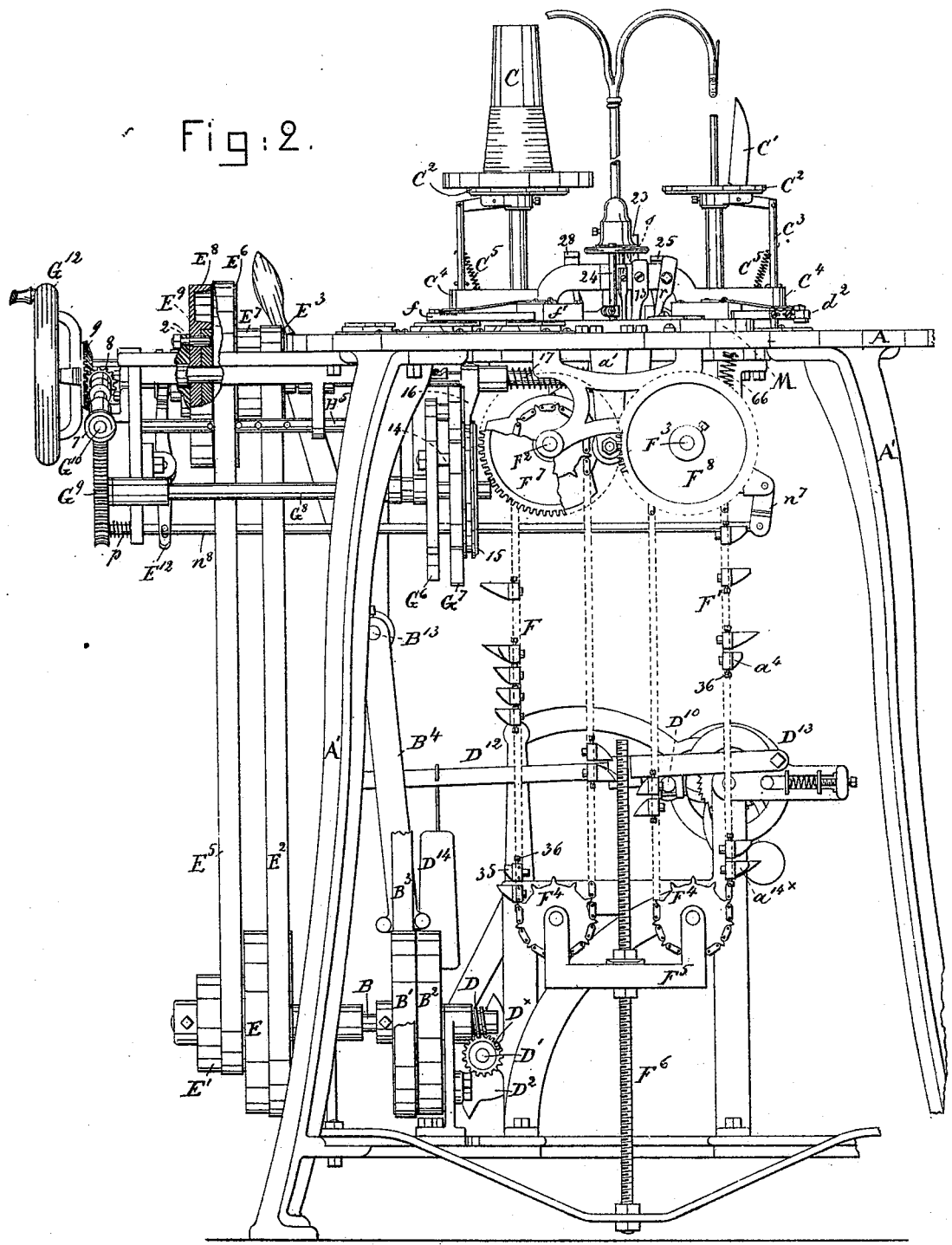

(No Model.) 10 Sheets—Sheet 3.
G. A. LEIGHTON.
KNITTING MACHINE.
No. 272,560. Patented Feb. 20, 1883.
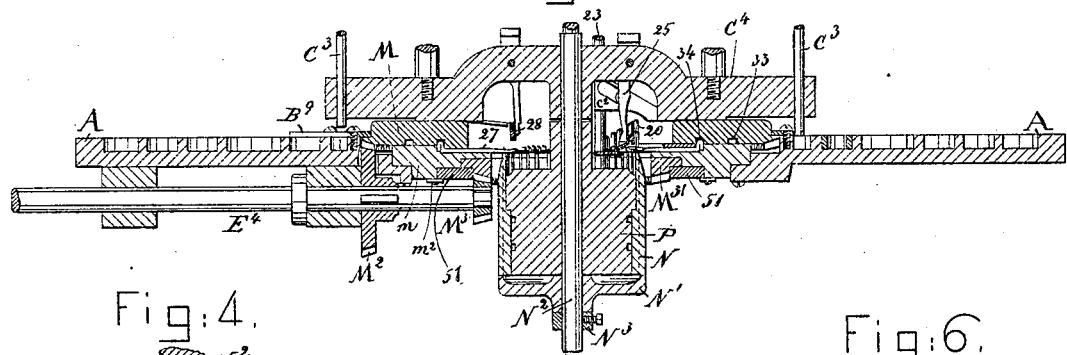
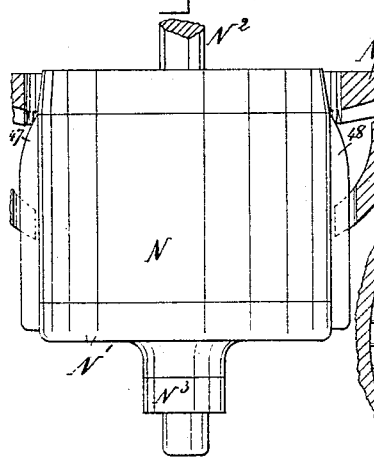
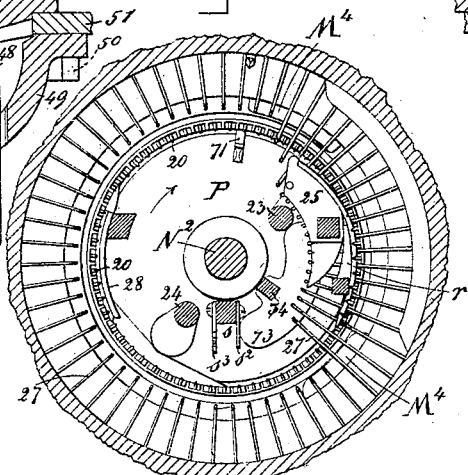
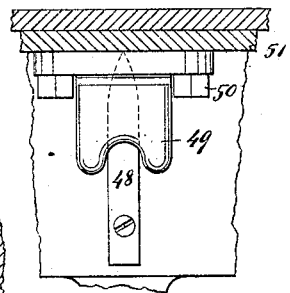
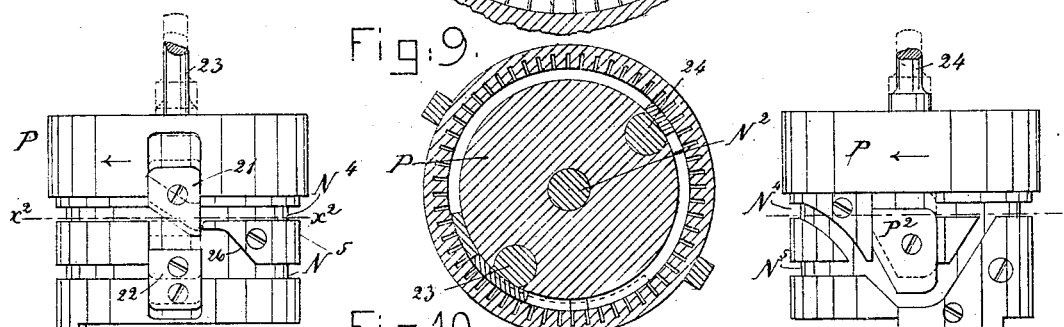
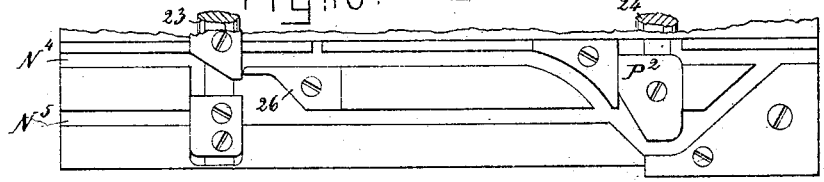
Witnesses.
Wm H Finckel
Geo M Finckel
Inventor.
George A. Leighton,
by Crosby & Gregory Attys (No Model.)
10 Sheets—Sheet 4.
G. A. LEIGHTON.
KNITTING MACHINE.
No. 272,560. Patented Feb. 20, 1883.
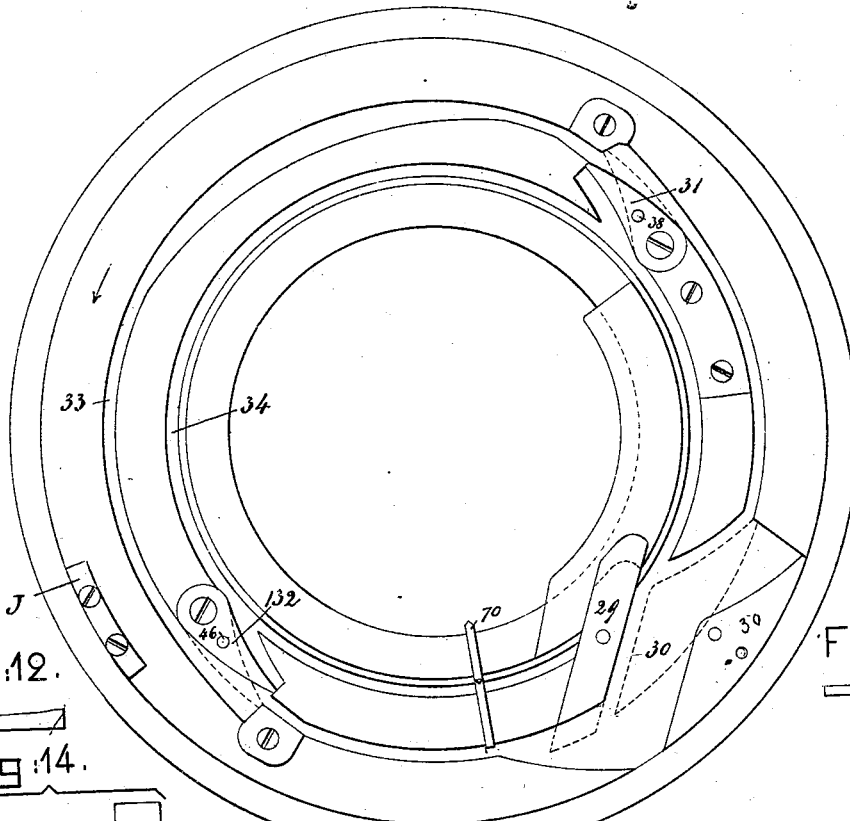
Fig. 11
Fig. 12.
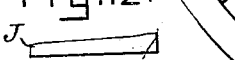
Fig. 13
Fig. 14.
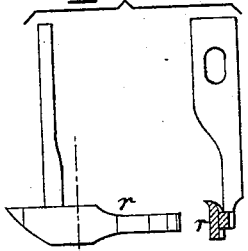
Fig. 16.
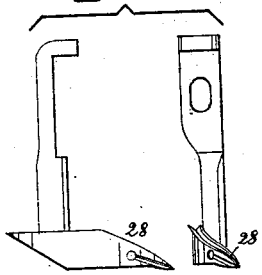
Fig. 17.
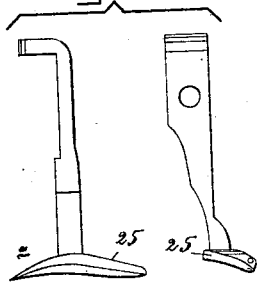
Fig. 18.
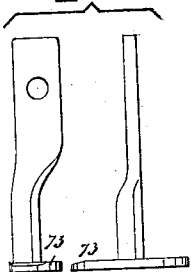
Fig. 15.
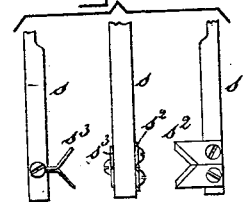
Fig. 19
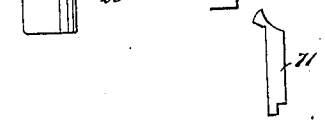
Witnesses.
Wm H Finckel
Geo M Finckel
Inventor.
George A Leighton
by Crosby & Gregory
Attys (No Model.) 10 Sheets—Sheet 5.
G. A. LEIGHTON.
KNITTING MACHINE.

No. 272,560. Patented Feb. 20, 1883.

Witnesses.
Wm H Ginckel
Geo. M Ginckel

Inventor.
George A Leighton
by Crosby & Gregory
Attys (No Model.) 10 Sheets—Sheet 6.

G. A. LEIGHTON.
KNITTING MACHINE.

No. 272,560. Patented Feb. 20, 1883.

Witnesses
Wm H Finckel
Geo. M Finckel

Inventor
George A. Leighton
by Crosby & Gregory Attys

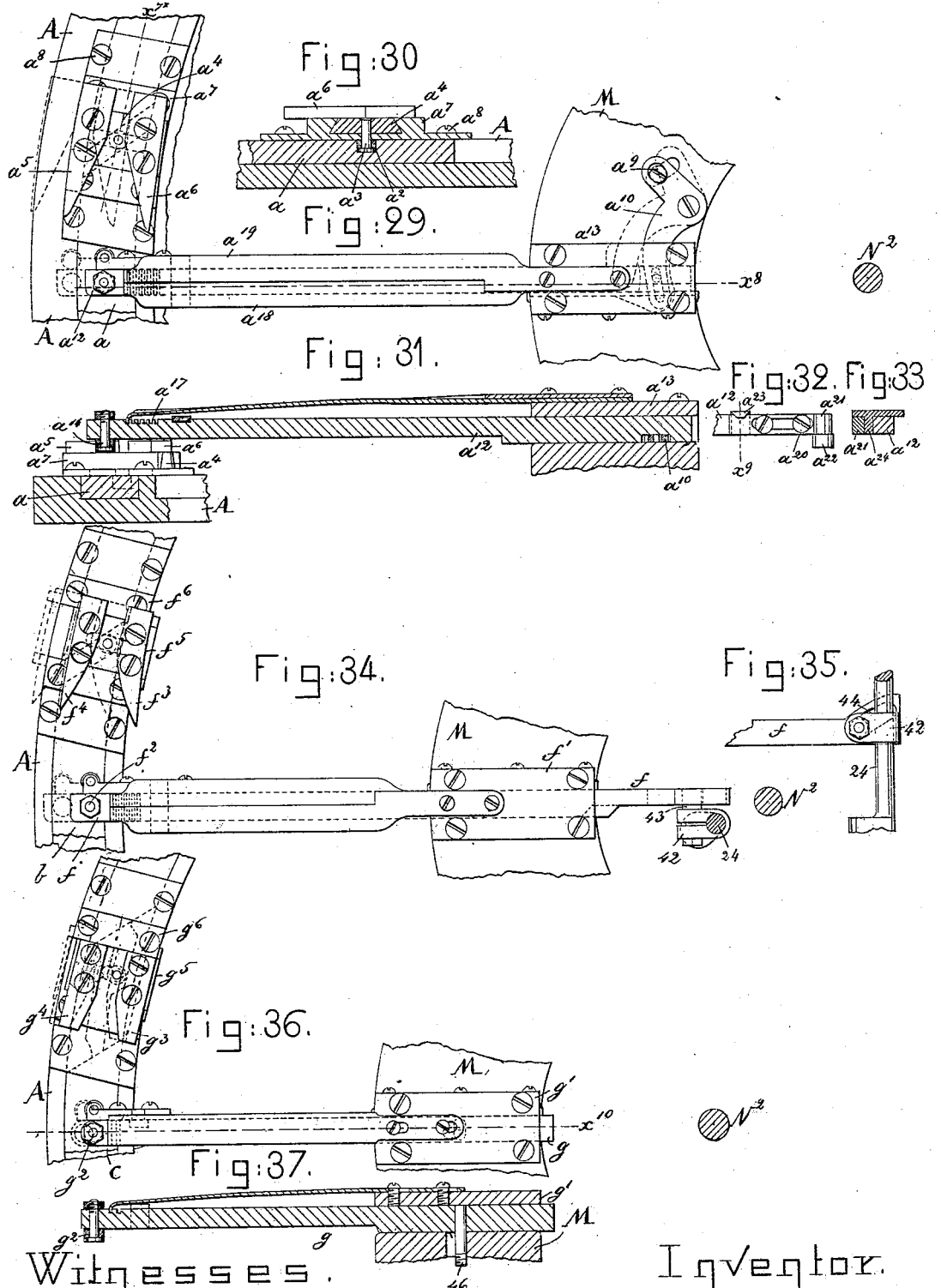

(No Model.) 10 Sheets—Sheet 8.
G. A. LEIGHTON.
KNITTING MACHINE.
No. 272,560. Patented Feb. 20, 1883.
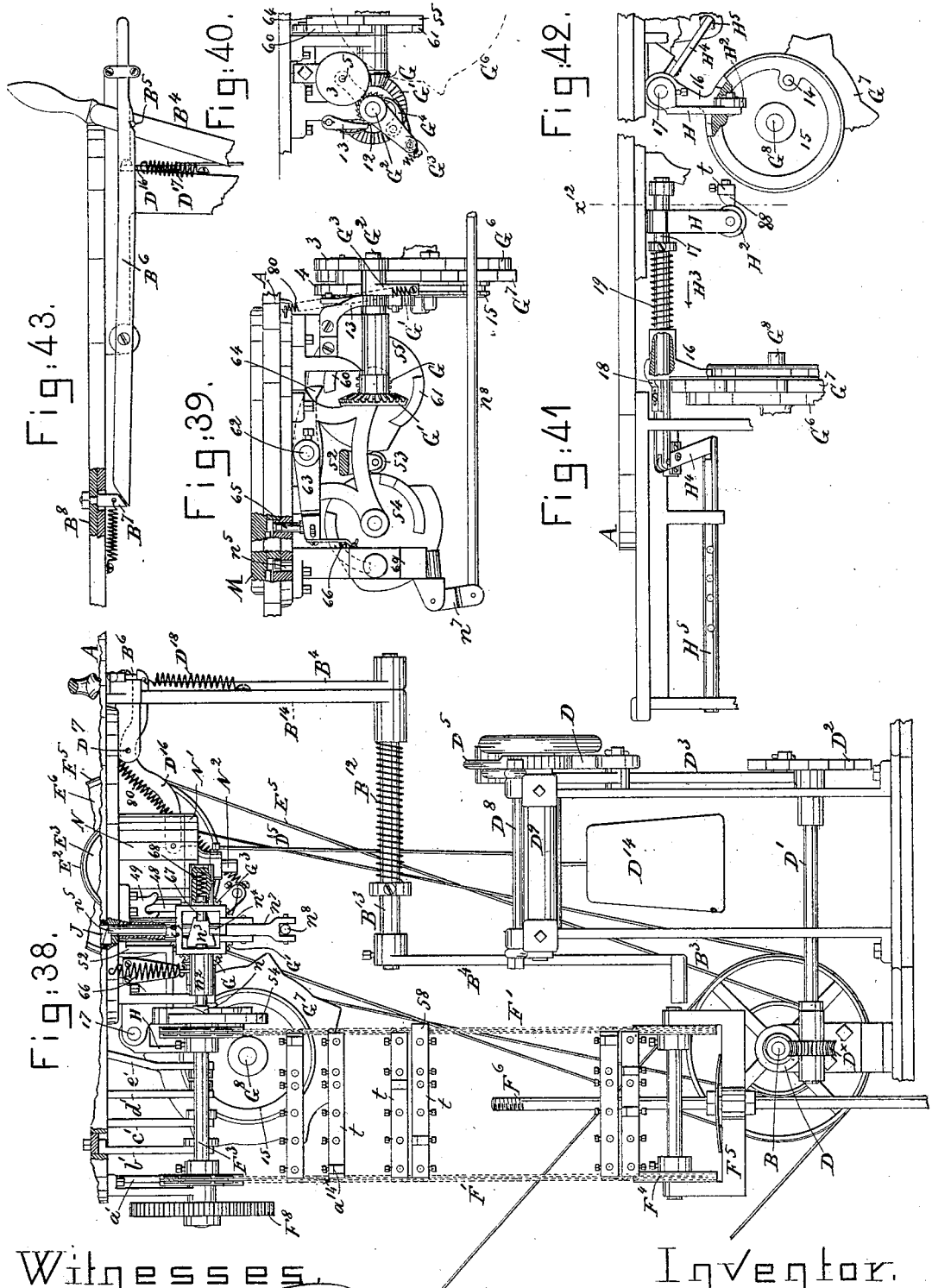
Witnesses
Wm N Finckel
Geo M Finckel
Inventor
George A. Leighton
by Crosby & Gregory
Atty (No Model.) 10 Sheets—Sheet 9.
G. A. LEIGHTON.
KNITTING MACHINE.
No. 272,560. Patented Feb. 20, 1883.
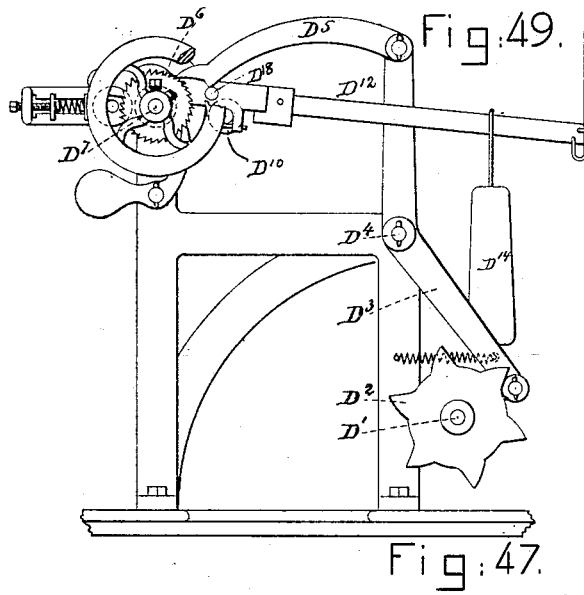
Fig. 49.
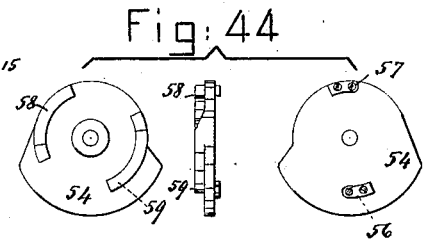
Fig. 44.
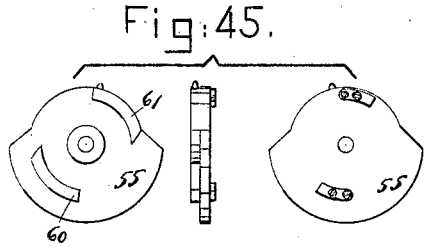
Fig. 45.
Fig. 47.
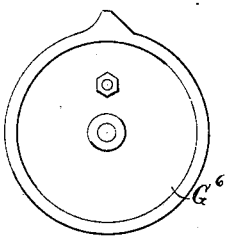
Fig. 46.
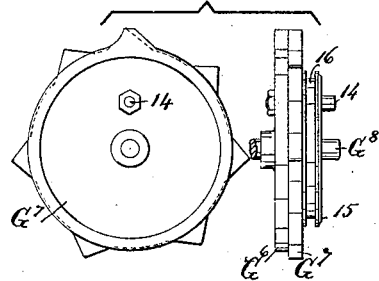
Fig. 48.
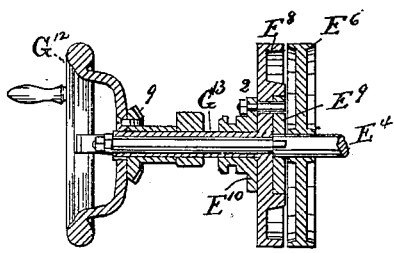
Witnesses
Wm H Finckel
Geo M Finckel
Inventor
George A Leighton
by Crosby Gregory
Atty
N. PETERS, Photo-Lithographer, Washington, D. C.

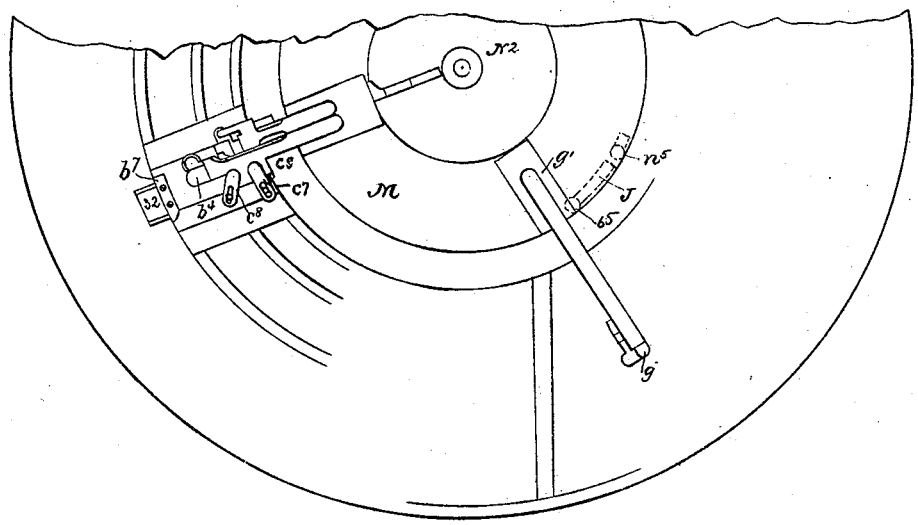

United States Patent Office.

GEORGE A. LEIGHTON, OF MANCHESTER, NEW HAMPSHIRE.

KNITTING-MACHINE.

SPECIFICATION forming part of Letters Patent No. 272,560, dated February 20, 1883.

Application filed April 3, 1882. (No model.)

*To all whom it may concern:*

Be it known that I, GEORGE A. LEIGHTON, of Manchester, county of Hillsborough, State of New Hampshire, have invented an Improvement in Knitting-Machines, of which the following description, in connection with the accompanying drawings, is a specification.

This invention relates to circular-knitting machines having plate and cylinder needles adapted to produce different kinds of ribbed work, as may be desired, and to knit a commencing course suitable for a finish for the knitted fabric.

The object of the invention is to enable the changes in position of the different cams which actuate the plate and cylinder needles, and also the needle-cylinder, to be controlled and effected automatically by a pattern-surface when it is desired to change from one to another kind of knitting.

This invention is an improvement on the machine described in my application No. 15,024, filed August 9, 1880, to which reference may be had. The machine herein described, embodying my invention, contains a series of plate and cylinder needles. The plate-needles are operated by a series of cams and cam-switches having connected slide-rods, the positions of which are changed, according to the requirements of the fabric, through certain Jacquard cams, to be described, moved by semicircular slides, provided with legs actuated by the projections of the Jacquard chain or pattern-surface. The cams and cam-switches for controlling the movement of the cylinder-needles and for shogging the needle-cylinder for the production of the commencing course to serve for the finished end of the fabric, or to produce an ornamental border or band, are also controlled as to their times of movement in like manner by the jacquard. The jacquard serves to arrest the knitting devices just before the needle-cylinder is to be shogged, for changes in knitting, and having determined the shogging of the needle-cylinder, the jacquard again effects the starting of the knitting devices. Instead of employing an independent thread for a separating course between two articles—such, for instance, as cuffs—or when part of one jacket is to be separated from another, or to separate two different varieties of knitting, I employ one of the threads of which the fabric is composed, manipulating it by knitting only on the plate-needles, the cylinder-needles then acting as sinkers, making preferably a single course of plain web, the stitches of which will be subsequently cut.

My invention consists in the several mechanical organizations hereinafter described, and particularly pointed out in the claims at the end of this specification, whereby I am enabled to make a knitting-machine, substantially such as represented, automatic in its operations, or, rather, make the movements of the two sets of needles and their actuating mechanism dependent upon a pattern-surface provided with pins or independently adjustable and changeable protuberances.

Figure 1 is a top view of my improved machine, the bobbins and stands being removed. Fig. 2 is a rear side view of the machine, some of the parts being broken out to more clearly show other parts, the Jacquard chain being partially shown in dotted lines. In Fig. 2 the cam-plate has been moved half a revolution beyond the position in Fig. 1. Fig. 3 is a partial vertical section of the machine, on the line of shaft $E^4$, the latter being, however, in elevation, the cam-plate having been turned sufficiently to place the yoke $C^4$ in the line of the said shaft. Fig. 4 represents in side view the needle-cylinder for the vertical needles and its attached dogs, the needle-cylinder being hung in the machine, a part of the bed for the plate-needles being shown in section. Fig. 5 is a detail in top view, showing the plate and cylinder needles in position, and part of the bed for the plate-needles, the upper end of the needle and cam cylinders for the cylinder-needles, and the two yarn-guides, and the support for the outer end of the plate-needles as they approach the combined yarn-guide and latch-opener for the plate-needles. Fig. 6 is a detail of the needle-cylinder, looking at it from the right of Fig. 4. Fig. 7 is a side elevation of the cam-cylinder at that part of it containing the switch for changing the positions of the cylinder-needles for different kinds of fabric. Fig. 8 is an opposite side view of the cam-cylinder, showing the usual knitting-cam for the cylinder-needles made adjustable for different lengths of loop. Fig. 9 is a section on the dotted line $x^2 x^2$, Fig. 7. Fig. 10 shows the main part of the cam-cylinder developed. Fig.

Figure 21:
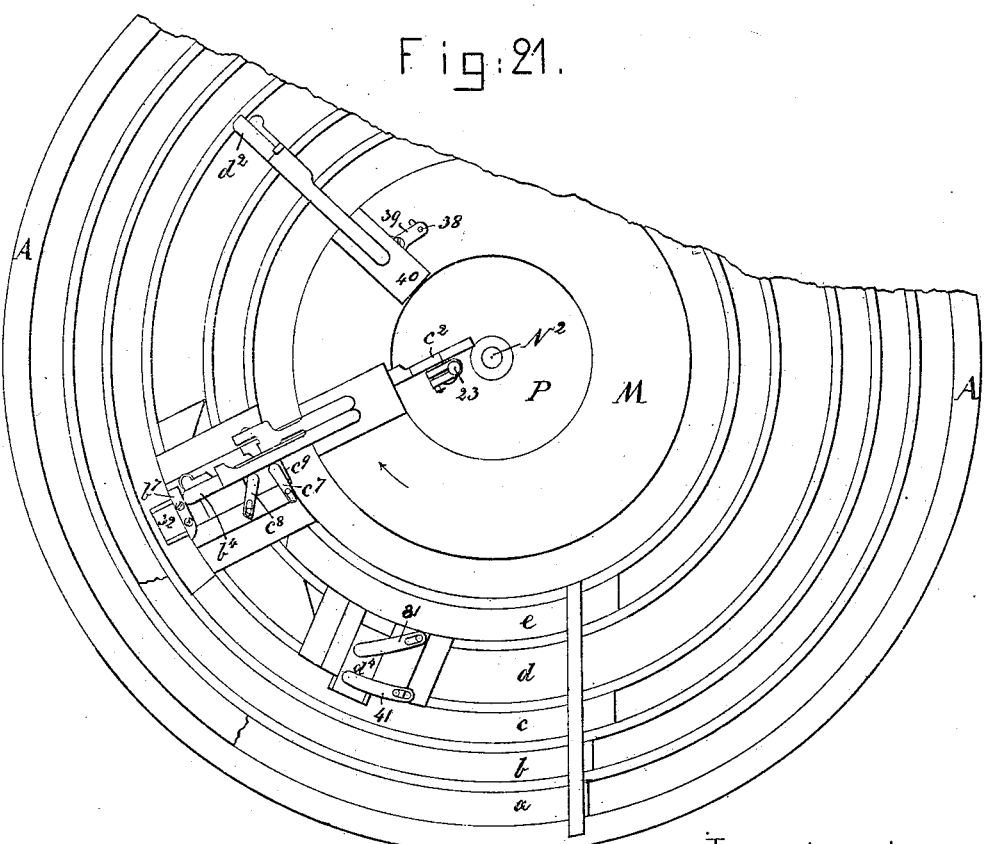
Figure 22:
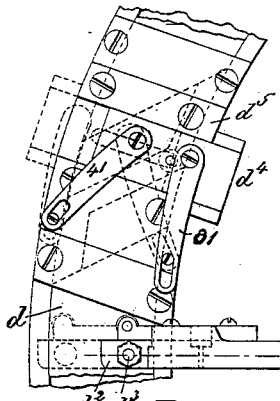
Figure 23:
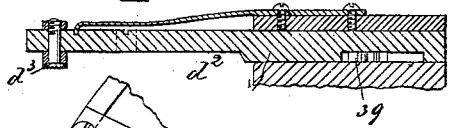
Figure 24:
Figure 25:
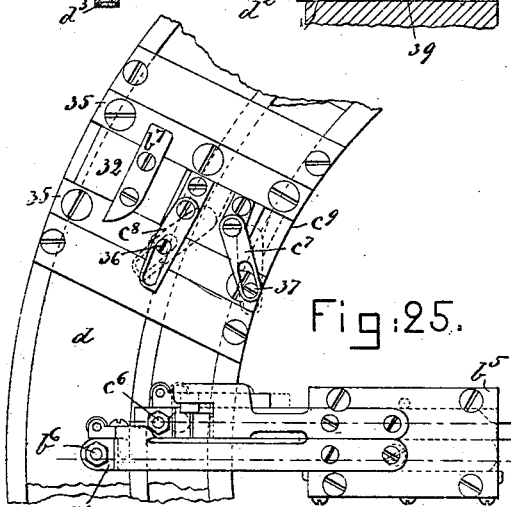
Figure 28:
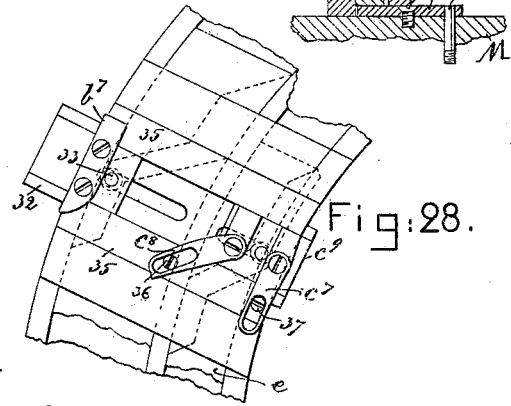
Figure 26:
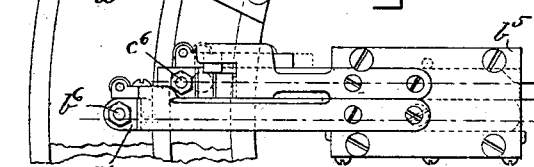
Figure 27:
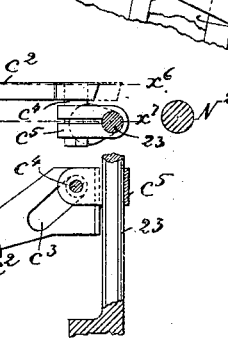

11, in full lines, represents the under side of the cam-plate with the cams and switches in the position they will occupy when the needle-cylinder is to be shogged. Fig. 12 is a detail of the stop carried by the cam-plate to arrest the said plate just before shogging the needle-cylinder. Fig. 13 is the removable key to close the opening for the introduction of plate-needles; Fig. 14, details of the latch-opener for the cylinder-needles; Fig. 15, details of the cutting device for the cylinder-needle yarn and the spring to hold the end of the yarn after it has been cut off from the work, as will be described; Fig. 16, details of the cylinder-needle-yarn guide and latch-opener combined; Fig. 17, details of the plate-needle-yarn guide and latch-opener combined; Fig. 18, details of the support for plate-needles; Fig. 19, the key to close the opening in the cam-cylinder for introduction of needles. Fig. 20 is a detail showing in top view one portion of the cam-plate and some of its attached slide-rods, and also a part of the bed of the machine with the semicircular slides and Jacquard cams; Fig. 21, a like view with the cam-plate in a different position—viz., when the needle-cylinder is to be shogged—Fig. 11 representing in full lines the position of all the cams in the cam-plate. Fig. 22, in dotted lines, represents a detail top view of the slide-rod which controls the cam-switch employed to put the plate-needles in position for the cylinder-needles to be shogged, and the Jacquard cam for moving the said slide, the said figure, in full lines, showing the said slide-rod and Jacquard cam in position to do regular knitting; Fig. 23, a section of Fig. 22 on the dotted line $x^4$; Fig. 24, a section of Fig. 22 on dotted line $x^5 x^5$. Fig. 25, in full lines, shows a detail top view of the slide-rods which change the switch of the cam-cylinder and the auxiliary throwing-out cam of the cam-plate. When the parts are in their full-line position, the switch of the cam-cylinder will be in its highest dotted line, Fig. 7, and the auxiliary throwing-out cam will be in its dotted-line position, Fig. 11. Fig. 25 also shows the Jacquard cam for moving the said slide-rods. Fig. 26, a section of Fig. 25 on line $x^6$; Fig. 27, a section of Fig. 25 on dotted lines $x^7$; Fig. 28, a detail showing the Jacquard cam of Fig. 25 in a different position. Fig. 29 represents in full lines the slide-rod to change the drawing-in cam for the cam-plate, the drawing-in cam being then in the dotted-line position, Fig. 11. Fig. 29 also shows the Jacquard cam to operate the said slide-rod, the dotted lines showing other positions to be described of the said devices; Fig. 30, a section on line $x^{7\times}$, Fig. 29; Fig. 31, a section on line $x^8$, Fig. 29; Fig. 32, a detail of the catch-lifting slide on the end of the slide-rod shown in Fig. 31; Fig. 33, a section of Fig. 32 on the dotted line $x^9$; Fig. 34, a detail showing in full lines the slide-bar for shifting the knitting-cam of the cam-cylinder and means to operate it, the said cam being supposed to be in its lowest position; Fig. 35, a detail of the right-hand end of Fig. 34; Fig. 36, a detail top view, showing the slide-rod for actuating the switch-cam which changes the plate-needles from cardigan to cuff work, and vice versa, the full lines showing the parts in the condition they will occupy when the machine is doing cuff-work, and when the switch at the left of Fig. 11 is in its full-line position. Fig. 36 also shows the means for operating the said slide-rod, and in dotted lines shows the said parts in their other extreme positions. Fig. 37 is a section of Fig. 36 on dotted line $x^{10}$; Fig. 38, a broken view, showing the bed-plate and some of the devices underneath it sufficiently in detail to illustrate the mechanism for operating the pattern surface or chain, the belt-shipper, and take-up; Fig. 39, a broken view to more fully illustrate the mechanism for operating the pattern surface or chain of the Jacquard mechanism; Fig. 40, a partial right-hand end view of Fig. 39; Fig. 41, a detail of the mechanism instrumental in changing the speed of the machine, the parts represented in Fig. 41 being mostly shown in place in Fig. 2; Fig. 42, a section of Fig. 41 on the dotted line $x^{12}$; Fig. 43, a detail elevation of the mechanism for releasing the belt-shipper; Fig. 44, details of the cam to move the needle-cylinder in one direction, and to assist in stopping the machine to shog the said cylinder; Fig. 45, details of a like cam to shog the needle-cylinder in the opposite direction; Fig. 46, details of the compound cam which operates the pattern surface or chain at the proper times; Fig. 47, a detail side elevation of one of the cams which assists in giving to the pattern-surface its slowest intermittent motion; Fig. 48, a sectional detail, showing the end of the main shaft and pulley thereon, to be described, having a long sleeve, which sleeve supports the collar and pin to be referred to; Fig. 49, a side view of the taking-up mechanism; and Fig. 50 is a detail showing part of the bed A, the cam-plate, and some of its attached parts, the said figure showing in dotted lines the stop J, to be referred to, as just being struck by the pin 65, the said figure showing the relative positions of the said parts in the machine.

The bed A of the machine is mounted on suitable legs, A', and connected with the said bed and legs are suitable brackets and bearings to support the working parts to be described. The counter-shaft B has on it a fast pulley, B', and a loose pulley, B², which receive at proper times the power-belt B³, controlled by the forked arm of a belt-shipper, B⁴, adapted to be liberated automatically to shift the belt B³ to the loose pulley whenever the yarn is exhausted from the bobbins or the work runs off the needles of the machine. The belt-shipper, near its handle, has a pin, B⁵, which is engaged, as in Fig. 43, by a catch of a pivoted latch, B⁶, having a beveled end, which is adapted to be operated upon by a beveled stud, B⁷, connected with a movable semicircular slide, B⁸, fitted into an annular groove of the bed-plate A. (See Fig. 1.)

Pins at or near the ends of the slide B⁸ enter slots in each of two elbow-levers, $B^9$, having their fulcra on pins secured to the bed-plate, the longer ends of the said levers being extended across a groove, $B^{10}$, made in the bed-plate A just within the groove which receives the slide $B^8$.

Each bobbin C will have a slot through its side wall and head to receive the end of the detecting-lever $C'$, shown as an elbow-lever pivoted on the support $C^2$ for the bobbin, as in Fig. 2. Each lever $C'$ has pivoted upon its outer lower end a rod, $C^3$, extended at its lower end through a hole in the yoke $C^4$. Each rod $C^3$ has a suitable spring, $C^5$, to draw it down whenever the yarn on the bobbin fails to keep the broad or blade-like upper end of lever $C'$ in vertical position within the slot made through the side of the bobbin. The lever $C'$ is permitted to turn outwardly only when the yarn upon the bobbin becomes exhausted. The lever $C'$, at the right of Fig. 2, is in the position it will occupy when not held up by the yarn, and the lower end of its rod $C^3$ will in such condition be depressed into the groove $B^{10}$, so that the end of the said rod, during the rotation of the yoke $C^4$, will strike the end of the lever $B^9$, then in its path, will move the said lever, and the latter will move its connected slide $B^8$, causing the stud $B^7$ to strike and tip the latch $B^6$, and release the shipper to be moved by its spring $B^{12}$.

The axis or fulcrum $B^{13}$ for the belt-shipper has its bearing in a hanger, $B^{14}$.

The shaft B has on its end a worm, D, which engages a worm-wheel, $D^x$, on the shaft $D'$, having at its end a cam, $D^2$. This cam actuates a lever, $D^3$, pivoted at $D^4$, and having a pawl, $D^5$, which engages a ratchet-wheel, $D^6$, on the shaft $D^7$, which has secured to it the usual fluted roll r, $D^8$, between which and the pressure-roller $D^9$ the knitted fabric is taken away from the machine.

The fabric, just at the rear of the rollers $D^8$ $D^9$, is acted upon by a roller, $D^{10}$, carried by a yoke, $D^{12}$, having hung upon it a weight, $D^{14}$, to enable the roll $D^{10}$ to exert the proper amount of tension on the work. The free end of this yoke is connected by rod $D^{15}$ with the lower end of a lever, $D^{16}$, pivoted at $D^{17}$, the other end of the said lever being extended under the latch $B^6$, before described.

The pawl $D^5$ is permitted to engage and operate the ratchet $D^6$ only when the yoke $D^{12}$ has been sufficiently lowered by reason of the production of knitted goods by the needles, the end of the said pawl then engaging the ratchet. The pawl $D^5$, when the said yoke is elevated and there is not sufficient goods to be taken up by the rollers, is kept from engagement with the ratchet $D^6$ by a pin, $D^{18}$, (see Fig. 49,) which projects from one side of the yoke $D^{12}$ and keeps the pawl lifted. When the work runs off the needles, the yoke $D^{12}$ drops and turns the lever $D^{16}$ to lift the latch and stop the machine, as before described. Spring $D^{18}$ counterbalances the weight of the rod $D^{15}$, the lower hooked end of which (see Fig. 49) does not hold up the yoke $D^{12}$ when the machine is delivering work properly.

The shaft B has on it a large fast pulley, E, and a smaller fast pulley, $E'$, each substantially twice as wide as the belt which it moves.

Pulley E, by band $E^2$ on the fast pulley $E^3$, drives the main shaft $E^4$ of the machine at its fastest speed. Pulley $E'$ has a belt, $E^5$, which is extended about the loose pulley $E^6$ on shaft $E^4$.

At the side of fast pulley $E^3$ is a loose pulley, $E^7$, of like diameter, and at the side of loose pulley $E^6$ is a clutch-pulley, $E^8$, of same diameter, but recessed at one side (see Figs. 2 and 48) to fit a flange, $E^9$, fast on the main shaft. The main shaft next the outer side of clutch-pulley $E^8$ has loose on it a grooved hub, $E^{10}$, embraced by the forked end of a pivoted lever, $E^{12}$. The loose hub $E^{10}$ has attached to it a pin, 2, which is made to project through a hole made in the side of the pulley $E^8$, which pin, as the said hub is reciprocated on the sleeve $G^{13}$ of the clutch-pulley $E^8$ by the lever $E^{12}$, is withdrawn from the flange $E^9$ within the pulley $E^8$, or is placed in a hole in the said flange. When the pin is engaged with the flange $E^9$, the clutch-pulley $E^8$ is clutched or made fast on the main shaft, and vice versa. When the machine is running at its highest speed, belt $E^5$ is on the loose pulley $E^6$; but when the speed of the machine is to be reduced—as when changes are being made in the several operating-cams, to be described—then the belt $E^5$ is shipped from the loose pulley $E^6$ upon the fast pulley $E^8$, and the belt $E^2$ from fast pulley $E^3$ onto loose pulley $E^7$. Such change of belts causes the jacquard to be operated one step of its chain at each revolution of the cam-plate, whereas when the belt is on the fast pulley $E^3$ the said jacquard is turned but one step at each six revolutions of the cam-plate.

The pattern-surface of the Jacquard mechanism is shown as two chains, F $F'$, extended over sprocket-wheels on the shafts $F^2$ $F^3$. The lower looped ends of the chains are extended about like sprocket-wheels $F^4$, carried by a yoke, $F^5$, made adjustable by a screw, $F^6$, to thus keep the chains taut. Each chain contains pattern-bars, on which are projections for one-half the changes to be made, the chains operating alternately.

The shafts $F^2$ and $F^3$ have at their ends toothed gears $F^7$ and $F^8$, which in practice are engaged with each other. In Fig. 2 the gear $F^7$ is shown broken out; but the line of its periphery is shown by dotted lines. The shaft $F^2$ is driven positively, as presently described, and moves the other with it by the gears referred to. The shaft $F^2$, at its rear end, has a bevel-pinion, G, (shown in Figs. 38, 39, and 40,) which is engaged by a larger bevel-gear, $G'$, on a shaft, $G^2$, having fixed on it a ratchet-wheel, 12. Loose on this shaft is a pawl-carrier, $G^3$, having a pawl, $G^4$, which engages the ratchet 12 and moves the shaft $G^2$ intermittingly. This pawl-carrier has a pin, 5, at its upper end, which supports two rolls or disks, 3 4, to be operated upon respectively by the cam-wheels $G^6$ $G^7$, the former having one throw-point, (see Fig. 47 and dotted lines, Fig. 40,) while the latter has seven throw-points. The cam-wheel $G^6$ always acts against the roll 3 at each sixth rotation of the cam-plate of the machine; but the cam $G^7$, when it is in position to strike the roll 4, actuates the pawl-carrier $G^3$ and its pawl more frequently, as it is necessary to do when the pattern-chain is to be moved more frequently to effect the necessary changes for knitting, &c., (as will be described from time to time.) The cam $G^6$ is fast on shaft $G^8$, having at its outer end a worm-gear, $G^9$, engaged and rotated by a worm, 7, on a short shaft, $G^{10}$, having a bevel-gear, 8, which is engaged with and driven from a bevel-pinion, 9, fixed to the hand-wheel $G^{12}$, which latter, as shown in Fig. 48, is fixed upon the long cylindrical sleeve $G^{13}$ of the clutch-pulley $E^8$, before referred to.

The rolls of the pawl-carrier $G^3$ are held against their actuating-cams by a spiral spring, 80, and reverse movement of ratchet 12 is prevented by a detent, 13. When the clutch-pin 2 is withdrawn from the flange $E^9$ by the forked lever $E^{12}$, as will be hereinafter described, and the belt drives the clutch-pulley $E^8$, then loose on the main shaft, the pattern-chain shaft will, through the shaft $G^8$, be turned while the main shaft and knitting mechanism are at rest, at which time and by which movement I am enabled to cause the jacquard to effect the shogging of the needle-cylinder, as will be hereinafter described.

The cam $G^7$, loose on shaft $G^8$, so as to be moved longitudinally thereon, is connected with and so as to move in unison with the shaft $G^8$ and cam $G^6$ by a pin, 14, (see Figs. 2 and 46,) extended from one side of cam $G^6$. Cam $G^7$, at its side, has fixed to it an annularly-grooved hub, 15, which receives in its groove a forked arm, 16, loose on the sliding rod 17, provided with a lug, 18, which acts against the hub of arm 16 and moves it positively to separate the cams $G^6$ $G^7$.

The rod 17 has upon it a spring, 19, the operation of which will be described further on.

When cam $G^7$ is in the position shown in Fig. 41 it is inoperative, or, rather, its periphery travels in the space between the two rolls 3 4, and does not actuate the pawl-carrier $G^3$; but when it is moved away from the cam $G^6$—as when the belts $E^2$ and $E^5$ are on the loose pulley $E^7$ and the clutch-pulley $E^8$, then fast with relation to the main shaft by the pin 2 and flange $E^9$—then the cam $G^7$ strikes the roll 4 and actuates the pawl-carrier $G^2$ to move the pattern-shafts more frequently. The rod 17 has fixed upon it an arm, H, provided with a roll, $H^2$, against which bears a projection or lug, 88, of one of the pattern-bars $t$. (See Fig. 41.) When the lug 88 strikes the said roll $H^2$, the rod 17 is moved positively in the direction of the arrow $H^3$, (see Fig. 41,) and by the lever $H^4$, of the first order, moves the shipper-rod $H^5$ in the direction opposite the rod 17, causing the pins on the said shipper-rod (shown in Fig. 2) to move the belts $E^5$ and $E^2$ upon the pulleys $E^6$ and $E^3$, as indicated in Fig. 2, when the fast speed of the machine is again resumed. At the commencement of the movement of rod 17 in the direction of arrow $H^3$ the roll 4 rested on one of the projections of cam $G^7$, thereby producing sufficient friction between the said roll and cam to practically prevent the sliding of rod 17, provided the arm 16 was fast on the rod 17. In view of this fact, and to enable this rod 17 to be moved at the exact time required to effect the changes in the machine without unnecessary loss of time, I had to place the hub of the arm 16 on the rod 17 and provide the spring 19 to be compressed during the movement of the said rod. As soon as the belts arrive in the position Fig. 2, the cam $G^7$ having been turned far enough to let the roll 4 drop from its projections, the spring 19 operates to move the arm 16 and cam $G^7$ quickly into the position Fig. 41.

The revolving cam-plate M is located in the open center of the bed A, and derives its movement of rotation from a bevel-pinion, $M^2$, on the main shaft $E^4$, (see Fig. 3,) it engaging an annular series of teeth at the under side of the said cam-plate, all as usual. The main shaft $E^4$, at its inner end, carries a bevel-gear, $M^3$, which engages a series of teeth at the under side of a loose ring, $M^{31}$, which has attached to it and projecting upward and inward two steel plates, $M^4$, (see Fig. 5,) which support the plate-needles which are being reciprocated. This is a common device.

The bed N for the cylinder or vertical needles 20 (shown clearly in Fig. 3) is supported at its lower end by a disk, $N'$, loose on a spindle, $N^2$, fast in the yoke $C^4$, which is bolted to the upper side of the cam-plate M, so that the said spindle, as the yoke is revolved with the plate M, turns in the disk $N'$, which rests on the collar $N^3$, fast to the said spindle, the pressure between the disk $N'$ and lower end of the bed N being sufficient to prevent disk $N'$ from turning.

The cam-cylinder P for the vertical needles, it being substantially the same as in my application No. 15,024, hereinbefore referred to, and fast upon the spindle $N^2$, has two annular grooves, $N^4$ $N^5$, (shown clearly in Figs. 7, 8, and 10,) which receive the butts of the cylinder-needles. The cam-cylinder P has a switch (see Fig. 7) composed of a block, 21, having its lower end beveled, and a block, 22, having its upper end parallel with one wall of the groove $N^5$, and of a rod, 23, to which the said blocks 21 and 22 are attached. The said cam-cylinder has also a knitting-cam, $P^2$, for drawing down the cylinder-needles 20, the said cam being connected with a rod, 24. When the switch is in its lowest position, as represented in full lines, Fig. 7, the butts of the needles will be diverted from the upper groove, $N^4$, into the lower groove, $N^5$, to enable cuff-work to be knit. This switch, in operation, has three positions, two of which are designated in Fig. 7 by dotted lines. The switch will occupy its second or next highest position (shown by dotted lines) when the separating course of yarn of plain knit-work is being knitted, the cylinder-needles then descending from the upper into the said lower groove; but the cylinder-needles are drawn down only so far by the lower end of block 21 as to enable the yarn supplied to the plate-needle-yarn carrier 25 to be drawn about the shanks of the cylinder-needles below their latches, so that after the cylinder-needles are further drawn down by the cams 26 and P² the loops of plate-needle yarn will close the latches of the cylinder-needles as they are drawn below the loops of plate-needle yarn on their shanks, permitting the said loops to be cast over the tops of the cylinder-needles, thus making a plain or unribbed fabric, it being understood at the time that the hooks of the cylinder-needles are not supplied with yarn. The switch of the cam-cylinder occupies this second position, however, for but a single rotation of the cam-cylinder, and the single course knitted at such time by the plate-needles with its regular thread will be subsequently cut and drawn out to separate the fabric knitted when the switch was previously in its lowest position from the fabric knitted when the switch occupied its highest position. When the said switch is in its highest position, the upper end of block 22 will close the gap in the lower wall of groove N⁴, and when being lifted from its lowest full-line position into its highest position, as shown in dotted lines, the upper end of the block 22 will act to lift the butts of all needles then above it into the line of the groove N⁴, and so long as the switch occupies its highest position the butts of the needles 20 will travel in the upper groove, and will not be reciprocated by the switch, but will be raised and lowered by the usual knitting-cams, P¹⁰ and P². The switch will be in its highest position when cardigan or half-cardigan work is being knitted, the vertical needles at such times being kept elevated while opposite the plate-needle-yarn guide, that the plate-needles 27 may draw the yarn of the plate-needle-yarn guide about the shanks of the cylinder-needles below their latches; but these cylinder-needles employed in knitting cardigan or half-cardigan work will have yarn introduced into their hooks by their own yarn-guide before their butts are acted upon by the drawing-down cam P², so that as the cylinder-needles come into the groove N⁵ the plate-needle yarn about the shanks of the cylinder-needles below their latches will close the said latches and imprison in the hooks of the cylinder-needles the loops of yarn supplied thereto by the cylinder-needle-yarn guide, the said loops of plate-needle yarn being cast off over the tops of the cylinder-needles.

The cam-plate M (see Fig. 11) has at its under side a drawing-in cam, 29, an auxiliary throwing-out cam, 30, and two pivoted throwing-out cams, 31 132, substantially such as in my application herein referred to.

The switch-cams 31 132, when they are in action, divert the butts of the plate-needles from the groove 33 into the groove 34. As shown in Fig. 11 in full lines, all the said cams are in position to permit the needle-cylinder to be shogged the distance of one needle, as described in my application referred to.

If it is desired to knit cuff-work or half-cardigan work, the switch-cam 31 and auxiliary throwing-out cam 30 will be put into their dotted-line positions, and if it is then desired to knit full cardigan the switch-cam 132 will be put into its dotted-line position. The auxiliary throwing-out cam 30 occupies its full-line position only when the cylinder is to be shogged, it being placed in such position before shogging the cylinder to enable the butts of the plate-needles in advance of it to remain in the groove 33 of greatest diameter, which keeps the plate-needles drawn in, and immediately after shogging the cylinder the auxiliary throwing-out cam will be moved into its dotted-line position, throwing out bodily the butts of the needles then in front of it, which enables them to have yarn supplied to their hooks by the plate-needle-yarn guide 25 before the butts of the said needles are acted upon by the drawing-in or knitting cam 29. After the cam 30 is moved into its dotted-line position, but before the cam-plate M completes its rotation, the switch-cam 31 will be moved into its dotted-line position to throw out the plate-needles just before they arrive at the latch-opening portion of the plate-needle-yarn guide 25, in order that the latches of the plate-needles may be properly opened for the reception of yarn therefrom.

Each of the cams and switch-cam of the cam-plate, and the switch and cam of the cam-cylinder, are in this my invention to be shifted automatically. Each of these cams and switch-cams and the switch has connected with it a slide-bar, which will be moved at the proper times, as I will now proceed to describe, by cams which I shall denominate "Jacquard cams," for the reason that they are put into one or the other of their operative positions through the instrumentality of the pattern surface or chains referred to.

The stationary bed A (shown in top view, Fig. 1, and partially in Figs. 20 and 21) has, it will be noticed, a series of concentric grooves, which receive a series of arc-shaped slides, $a$ $b$ $c$ $d$ $e$, having, respectively, legs $a'$ $b'$ $c'$ $d'$ $e'$. (See Fig. 38.) The slide $a$, at one end, has a diagonal slot, $a^2$, (see Fig. 30, and in dotted lines, Fig. 29,) which receives a roller-pin, $a^3$, projected downward from the sliding block $a^4$, having attached to its upper side by screws the two cams $a^5$ $a^6$. The block $a^4$ is fitted between guides $a^7$ of a plate attached to the bed A by screws $a^8$.

The cams $a^5$ $a^6$ are employed to shift the drawing-in or knitting cam 29 of the cam-plate. The cam 29 has at its upper side a screw-stud, $a^9$, extended up through a slot in the cam-plate M, as shown in Fig. 29. The stud $a^9$ is engaged by one end of the elbow-lever $a^{10}$, the long arm of which is made to enter a transverse slot in the under side of the slide-rod $a^{12}$, (see Fig. 31,) fitted into a guide-box, $a^{13}$, secured upon the top of the cam-plate M.

The slide-bar $a^{12}$, at its outer end, has a roller-stud, $a^{14}$, which strikes against one or the other of the cams $a^5$ $a^6$ when placed in the path of movement of the said roller-stud by the pattern-surface. When the slide-rod $a^{12}$ is in the position represented in full lines, Figs. 29 and 31, the knitting-cam 29 will occupy its dotted-line position, Fig. 11, and the plate-needles will be drawn to produce the maximum length of stitch; but when the said cam 29 is as in full lines, Fig. 11, the slide-rod $a^{12}$ will be in the position shown by dotted lines, Fig. 29, and full lines, Fig. 1.

If it is desired to change the position of the sliding block $a^4$ so as to move the cam 29 into its full-line position, Fig. 11, to draw a short loop, one of the projections, $a^{14\times}$, near the end of one of the bars $t$ of the pattern-chain F', will strike the leg $a'$ and push the arc-shaped slide $a$ in the direction of the arrow $a^{15}$, Fig. 1, far enough to move the sliding block $a^4$ and place the cams $a^5$ and $a^6$ into the dotted-line position, Fig. 29, so that during the rotation of the cam-plate the roller-stud $a^{14}$ on the slide-rod $a^{12}$, it then occupying the full-line position, will strike the cam $a^6$, which will at once draw the said slide-rod into its dotted-line position and place cam 29 in its full-line position. The cams $a^5$ and $a^6$ will remain in this dotted-line position until the cam 29 is to be again changed, the roller-stud moving freely through the open space between the said cams, and the slide-rod $a^{12}$—which, it will be noticed, is toothed at its upper side, as at $a^{17}$—will be held in place by one of the slide-rod locking catches or springs $a^{18}$ or $a^{19}$, the ends of which are hooked to enter the spaces or notches between the said teeth. When the bent or hooked end of one of the said catches enters one of the said notches, the bent or hooked end of the other of said catches will rest upon the top of a tooth next to the notch then entered by one catch.

By the employment of the two catches—one to enter a notch and the other to rest upon a tooth, as described—I am enabled to make finer adjustments than by the employment of but one spring.

The slide-rod $a^{12}$, at its front side, has attached to it by screws $a^{20}$ a catch-lifting slide, $a^{21}$, provided with a roll, $a^{22}$, which, when the catches $a^{18}$ and $a^{19}$ are to be lifted to permit the slide-rod $a^{12}$ to be shifted, will first strike against that one of the cams $a^5$ $a^6$ then in operative position, which will move the catch-lifting slide $a^{21}$ longitudinally on the slide-rod $a^{12}$ before the roller-stud $a^{14}$ of the said slide-rod strikes the said cam. The movement of the said catch-lifting slide in advance causes one or the other of the inclines on it (shown in Fig. 32) to act upon one or the other of the inclined edges of a finger, $a^{23}$, which rests in a depression of the said lifting-slide between its inclined edges, and causes one or the other of the said edges to lift the finger, so that it, acting against the under side of catch $a^{18}$ $a^{19}$, lifts that one of them which is then engaged with a notched part of slide-rod $a^{12}$, leaving the said slide-rod free to be moved longitudinally as soon as the roller $a^{14}$ strikes the cam $a^5$ or $a^6$ which is then in operative position. When the roller-stud $a^{14}$ of the slide-rod $a^{12}$ reaches a position between the two parallel walls of the two cams $a^5$ $a^6$, (the roller $a^{22}$ of the lifting-slide $a^{21}$ having been held from longitudinal movement by the parallel walls of the cams $a^5$ $a^6$ while the slide was being moved longitudinally,) it will be observed that the relative longitudinal positions of the slide-rod and the catch-lifting slide will have been changed sufficiently to again bring the notched part of the lifting-slide directly under the finger, so that it is permitted to fall, and with it the catches above it, that one of the catches which was upon the top of a tooth then dropping into a notch between the said tooth and the one next to it.

Each of the slide-rods herein employed will have one or two locking-catches such as described, and a catch-lifting slide to disengage it from the toothed part of the slide-rod, with which it is adapted to co-operate; so I will not herein further describe such devices; nor do I consider it necessary to letter the said parts in the other figures.

When the slide-block $a^4$ is to be moved to move the cams $a^5$ $a^6$ from their dotted to their full line position, Fig. 29, the leg $a'$ of the arc-shaped slide $a$ will be acted upon by a suitable projection, 35, of the chain F.

Each projection $a^{14\times}$ or 35, to effect the change of length of loop, as described, will be made adjustable on the bars $t$ of the chains by means of set-screws 36, so that the arc-shaped slide may be moved more or less, and so place the cams $a^5$ or $a^6$ that more or less of their inclined faces may operate to move the slide-rod more or less, according to the distance it is desired to move the drawing-in cam 29.

The auxiliary throwing-out cam 30 has a screw pin or stud, $b^2$, (see Fig. 27,) which is passed up through a slot, $b^3$, in the cam-plate M, and into a slide-rod, $b^4$, held in a guide-box, $b^5$. The said slide-rod $b^4$, at its outer end, has a roller-stud, $b^6$, which acts to draw the slide-rod $b^4$ outward and place the auxiliary throwing-out cam 30 in its full-line position preparatory to shogging the needle-cylinder N. The roller-stud $b^6$ acts against one edge of the cam-link 81 when the latter is in the position shown in Fig. 21 and in dotted lines, Fig. 22. As soon as the roller-stud $b^6$, it having passed beyond the cam-link 81, reaches a position opposite the cam $b^7$, it occupying the position shown in Figs. 21 and 28 during the shogging of the needle-cylinder, the slide-block 32, to which the said cam $b^7$ is screwed, is moved inward toward the center of the cam-plate by means of the arc-shaped slide $d$, which, as described of arc-shaped slide $a$, has near its end a diagonal or cam slot, (shown in dotted lines, Fig. 28,) to receive a downwardly-extended roller-pin, 33, carried by the slide-block 32. The arc-shaped slide $d$ will have its leg $d'$ acted upon at opposite edges in the proper order by suitable projections on the face of the pattern-chains F F'.

The switch before described as forming part of the cam-cylinder P (fully shown in Fig. 7) is automatically operated by the slide-rod $c^2$, held in the guide-box $b^5$ at the side of the slide-rod $b^4$. The slide-rod $c^2$, at its inner end, has a diagonal slot, $c^3$, into which is entered the roller-stud $c^4$ of a clamp-block, $c^5$, securely clamped upon the rod 23 of the said switch. The slide-rod $c^2$, at its outer end, has a roller-stud, $c^6$, which, during the rotation of the cam-plate M, will act upon the edges of the cam-links $c^7$ $c^8$, whichever link may be placed in operative position in accordance with the projections of the pattern-chains. When the slide-rod $c^2$ is in the position shown in Figs. 1, 25, and 26, the switch will be in its highest dotted-line position, Fig. 7, to enable the machine to knit cardigan or half-cardigan, as before described. If the said switch is to remain in its highest position, the cam-links $c^7$ $c^8$ will remain as shown in full lines, Figs. 1 and 25, and the roller-stud $c^6$ will pass freely between the cam-links $c^7$ $c^8$; but if the said switch is to be lowered one step, as when introducing the separating course of yarn taken from the plate-needle-thread guide, the cam-links $c^7$ $c^8$ will be turned into the dotted-line positions, Fig. 25, before the roller-stud $c^6$ reaches them, so that the said stud will strike one edge of the cam-link $c^8$. The switch will ordinarily be held in its intermediate position last referred to for but one course, when the cam-links $c^7$ $c^8$ will be put into their full-line positions, Fig. 28, so that the roller-stud $c^6$, during the next revolution of the cam-plate M, will strike the edge of the cam-link $c^8$, it then being placed at a greater angle than in dotted lines, Fig. 25, which will cause the slide-rod to be moved yet farther inward toward the center of the cam-plate, to put the switch into its lowest or full line position, Fig. 7, to enable the machine to knit cuff-work or one-and-one-rib work with the plate-needles and the yarn of the plate-needle-yarn guide, the said plate-needles drawing the said yarn about and into the hooks of the cylinder-needles, as usual.

Each cam-link $c^7$ and $c^8$ at one end is pivoted to a slide-block, $c^9$, in line with the slide-block 32, both of which blocks are fitted to slide in the same guides, 35. The other ends of the cam-links $c^7$ $c^8$ are slotted, as shown in Figs. 25 and 28, to fit over stationary pins 36 37, fixed to the guide 35.

The slide-block $c^9$ has at its under side a roller-stud, (shown in dotted lines, Fig. 28,) which enters a diagonal slot, also therein shown in dotted lines, made in the arc-shaped slide $e$, the leg $e'$ of which is acted upon at one or the other of its edges, or roll thereon, by suitable projections arranged upon the bars $t$ of the two pattern-chains F F'.

The switch-cam 31, (see Fig. 11,) which, when in its temporary full-line position, retains the butts of the plate-needles in the groove 33 of greatest diameter, the auxiliary cam 30 then occupying its full-line position, Fig. 11, has a stud or screw, 38, which is extended up through a slot in the cam-plate M, as shown in Fig. 22, where it is engaged by a lever, 39, the other end of which, extended through an opening at one side of the guide-box 40, enters a recess formed at the lower side of the slide-rod $d^2$, the said recess being sufficiently large to admit of lost motion, as will be described.

The slide-rod $d^2$ has a roller-stud, $d^3$, which, when the switch-cam 31 is in its dotted-line position—the machine then knitting regularly, and the auxiliary throwing-out cam being in its dotted-line position, Fig. 11—will pass freely between and not be actuated by the cam-links 81 and 41. When the slide-rod $d^2$ is in its full-line position, Fig. 22, and the switch-cam 31 is in its dotted-line position, if it is desired to then place the said switch-cam temporarily in its full-line position, Fig. 11, the slide-block $d^4$, fitted into guides $d^5$, will be moved by the arc-shaped slide $d$, it having a suitable diagonal slot, (shown in Fig. 22,) which acts on a roller-stud at the under side of the said block $d^8$, to place the cam-links 81 41 in their positions shown by dotted lines, Fig. 22, and full lines, Fig. 21, when the roller-stud $d^3$ will strike the edge of the cam-link 81, which, acting as a cam, will draw the slide-bar $d^2$ outward into its dotted-line position, Fig. 22, where it will remain for one revolution of the cam-plate M, when the roller-stud $d^3$ will strike the edge of cam-link 41, which, during each one revolution, or nearly so, of the cam-plate M, has been changed from its dotted to its full line position, Fig. 22.

The knitting-cam $P^2$ of the cam-cylinder (fully shown in Fig. 8) has a rod, 24, which is embraced by a clamp, 42, (see Figs. 34 and 35,) having a roller-stud, 43, which is entered into a slot, 44, at the end of the slide-rod $f$, fitted into the guide-box $f'$, secured to cam-plate M. The outer end of slide-rod $f$ is provided with a roller-stud, $f^2$, such as common to the other slide-rods, which at proper times strikes one or the other of the cams $f^3$ $f^4$, or passes freely between them if the cam $P^2$ is not to be raised or lowered. With the slide-rod $f$ in its full-line position, Fig. 34, the cam $P^2$ will occupy its full-line position, Fig. 8, to thus draw loops of greatest length, and so long as the cams $f^3$ $f^4$ occupy their full-line position, Fig. 34, said slide-rod will not be changed.

If it is desired to draw shorter loops of yarn by means of the cylinder-needles, the cams $f^3$ $f^4$ will be moved into their dotted-line positions, Fig. 34, when the roller-stud at the end of the slide-rod $f$ will strike the cam $f^3$, which will move the slide-rod $f$ outward into its dotted-line position. These cams $f^3 f^4$ are secured to a cam-block, $f^5$, fitted into guides $f^6$, secured to the bed A. The block $f^5$ will have at its under side a suitable roller-stud to enter a diagonal slot in the arc-shaped slide $b$, the said stud and slot being represented in dotted lines, Fig. 34. The leg $b'$ of slide $b$, or the roll at its lower end, will be struck at the proper times by suitable projections of the pattern-chains F F', so as to move the said arc-shaped slide positively in either of its two directions, and the said projections of the said pattern-chains, as described of the projections $a^{14 \times}$ and 35, will preferably be made adjustable, so that the cams $f^3$ and $f^4$ may occupy any desired intermediate positions between their full and dotted line positions shown in Fig. 34.

The loops of yarn drawn by the cylinder-needles from the cylinder-needle-yarn guide will be lengthened automatically when changing from cuff to cardigan or half-cardigan. Heretofore when it has been desired to separate two knitted tubular articles made in succession, one of which is to present a finished end, it has been customary to introduce one or more courses of a different thread, usually a smooth cotton thread temporarily tied on the regular yarn, which cotton thread was thereafter withdrawn.

I have discovered that tubular ribbed knitted fabrics will not unravel on the machine, provided the last or next to the last terminating course of the fabric is knitted with the cardigan or half-cardigan stitch—two yarns being then used—and that the loops formed from the yarn taken by the cylinder-needles from the cylinder-needle-yarn guide brought into operation for cardigan-work be drawn by the said cylinder-needles to produce a course of long loops, or loops of an extreme length; and that, to separate the terminating end of said fabric from the fabric next to be commenced and ended on the machine, I need not introduce a separate cotton thread, as heretofore, but may introduce instead one course of thread from the regular yarn of the plate-needle-thread guide, the said course being, however, knitted entirely by the plate-needles, the cylinder-needles then acting as sinkers, as before described, and forming one course of plain web such as would be produced in a circular-knitting machine containing but one set of needles.

The switch-cam 132 (see Fig. 11) has a pin, 46, which is extended up through a slot in the cam-plate M, as in Fig. 37, and into a hole in a slide-rod, $g$, which latter, fitted into a guide-box, $g'$, attached to the plate M, has a roller-stud, $g^2$, which, as the cam-plate M is rotated, causes the said roller-stud to strike one or the other of two cams, $g^3 g^4$, attached to a cam-block, $g^5$, fitted into the guide $g^6$, or enables the said roller to pass between the said cams freely. When the switch-cam 132 is in its full-line position, Fig. 11, the machine then knitting half-cardigan or one-and-one rib work, the slide-rod $g$ will occupy the full-line position, Fig. 36; but when the said switch is in its dotted-line position the slide-rod $g$ will be as in full lines, Fig. 1, and as in dotted lines 36. To change the switch 132 from its full to its dotted line position to knit cardigan-work, the cams $g^3 g^4$ will be moved into their dotted-line positions, Fig. 36, so that the roller-stud $g^2$ will strike the cam $g^3$, which will draw the slide-rod $g$ outward into the dotted-line position, Fig. 36, or into the full-line position, Fig. 1. Subsequent movement of the cams $g^3 g^4$ back into the full-line position, Fig. 36, will effect the movement of the slide-rod $g$ in the opposite direction, or back into its full-line position, Fig. 36.

The slide-block $g^5$ has at its under side a pin which enters a diagonal slot (see dotted lines, Fig. 36) made in the arc-shaped slide $c$, having a leg, $c'$, provided with a truck or roll which is acted upon at the desired times by suitable projections on the pattern-chains F F', according to the direction it is desired to move the said slide $c$ or the slide-block $g^5$.

Having knitted the one plain course referred to with the regular yarn taken from the plate-needle-yarn guide, the next course in succession will enter into and form part of the next article to be knitted, which will be supposed to be a cuff knitted with the rib-stitch, both sets of needles being then employed, the yarn being delivered from the plate-needle yarn guide. To so manipulate this course, as described in my application referred to, that the commencing course shall serve as a finish for the end of the cuff joined with the separating course and obviate hand finishing, I shog the needle-cylinder to the right or left the distance of one needle. This is done at the end of the first course after the introduction of the separating course referred to, and the second and other succeeding courses of the cuff will be knitted with the cylinder-needles in their shogged positions; or, if it is desired to produce a series of crossed loops to serve as an ornamental border, the needle-cylinder may be shogged in the opposite direction at the end of one or more courses. By cutting the separating course the cuff just referred to may be separated from the article previously knitted, and with which it is joined by the separating course.

The cylinder N has at opposite sides two dogs, 47 48, which are embraced by the forks 49, secured by bolts 50 upon the ring 51, fitted into an annular recess at the under side of the bed M for the plate-needles, (see Fig. 3.) the said ring 51 being retained in its recess by buttons $m^2$. The ring has connected with it an arm, 52, (shown best in Fig. 38,) having a roll, 53. (See Fig. 39, where the arm 52 is shown in section.) The roll 53 is placed between the peripheries of the two cylinder-shogging cams 54 55. (See Fig. 39 and separately in Figs. 44 and 45, which latter figures show the opposite sides and edge of the said cams.) The peripheries of these cams act against the roll 53 and move the arm and needle-cylinder N in one or the other direction, as may be desired. These cams 54 and 55 are held loosely on the shafts $F^2$ $F^3$ of the sprocket-wheels by which the chains F F' are suspended and moved.

Each cam 54 and 55, at its rear side, is provided with two dogs having square ends, and secured to the cams so that they will be in the path of movement of the projecting ends 58 of some of the bars of the pattern-chains, (see Fig. 38,) so that the ends 58 of said bars will, at the proper times, strike the dogs and turn the said cams intermittingly for half a revolution, the part of greatest radius of one of the said cams being always opposite a part of the other cam of least radius, so that the two cams by their joint operation will hold the roller 53 steadily, moving the needle-cylinder positively in either direction, and holding it in place against accidental movement. The cam 54 has two side inclines, 58 59, and the cam 55 has two lifting-cams, 60 61. The cams 54 and 55, as shown in Fig. 39, are in the position they will occupy when the machine is knitting regularly, the cam-plate then rotating.

As described in the early part of this specification, the knitting mechanism must be entirely stopped while the needle-cylinder is being shogged; but at such time the motion of the Jacquard chain is continued. To effect this the machine is provided with a rock-shaft, 62, (see Fig. 39,) having two arms, 63 and 64. The arm 63, at its outer end, is connected with a pin, 65, which is projected up through a hole in the bed A by the spring 66 (see Figs. 38 and 39) just before or as the stop J, (see Fig. 11,) connected with the under side of the cam-plate M, reaches a position in the movement of the said cam-plate near the hole above the said pin 65. The pin 65 having been thrown up, as described, its upper end is struck by the end of the stop J, connected with the cam-plate M, and the further rotation of the cam-plate is arrested. In Fig. 53, I have shown this stop in dotted lines as just to strike against the pin 65. The dotted lines, Fig. 53, also show the positions of some of the other parts of the machine just as the stop and pin are to strike. The spring 66 assumes control of the rock-shaft as soon as the end of its arm 64 arrives at the end of the cam 60. While the cam 55 is being rotated one of the side cams, 58 or 59, of the cam 54—it being rotated at the same speed as cam 55—acts against the inclined end of the plunger $n$, held in the bearing $n^2$.

The front end of the plunger $n$ is slotted to receive loosely the wedge $n^3$, the opposite end of which is inserted in a slot made in the end of a short pin, 67, held in the yoke 69 and pressed outward by the spring 68. The upper edge of the wedge $n^3$, when pushed toward the right in Fig. 38, acts upon the lower end of and lifts the pin $n^5$.

The stop J (see Figs. 38 and 12) is inclined, so that as the forward end of the said stop comes in contact with the upper end of the elevated pin $n^5$ it will depress the same, the wedge $n^3$ then descending with it, owing to its peculiar connection with the plunger $n$, and the inner edge of the said wedge, by its action against the upper end of the pin $n^4$—which, at its lower end, rests upon one arm of the bell-crank lever $n^7$—turns the said bell-crank lever and moves horizontally the rod $n^8$, which, at its other end, is joined with the lever $E^{12}$, which embraces the collar $E^{10}$, and by the movement of the said collar disconnects the clutch-pulley $E^8$ from the flange $E^9$, fixed to the main shaft. Just as the pin 2 of the collar is withdrawn from the flange $E^9$ the front end of the stop J arrives against the pin 65, before referred to, and the knitting parts of the machine are instantly stopped; but the clutch-pulley $E^8$ continues to revolve, as the belt $E^5$ is then on it, and, as described in the early part of this specification, the motion of the pattern-chains is continued. The continued rotation of the cams 55 and 54 carries the cam 61 into position to strike the rear end of arm 64 of the rock-shaft 62, causing the arm 63 to pull down the pin 65 away from the stop J, and at the same time, or substantially so, the side cam, 59, passes the end of the plunger $n$, permitting the spring 68 to act to push the wedge $n^3$ and plunger $n$ toward the left in Fig. 38, which permits the spring $p$ (see Fig. 2) to operate the rod $n^8$ and lever $E^{12}$ to actuate the collar and pin 2 for the latter to engage the flange $E^9$, when the rotation of the main shaft will be again resumed.

The latch-opener for the cylinder-needles is lettered $r$, and is shown clearly in Figs. 14 and 5. It operates as usual.

When one-and-one-rib knitting for a cuff is to follow cardigan or half-cardigan work, the one-and-one knitting employing but one thread, while in cardigan and half-cardigan two threads are used, as described, the yarn supplied by the cylinder-needle-yarn guide to the hooks of the cylinder-needles must be cut off between the said yarn-guide and the fabric just after the cylinder-needles are lowered by the passage of their butts down through the switch into the groove $N^5$, when they cease to be supplied by yarn from the cylinder-needle-yarn guide. By drawing down the cylinder-needles in this way their hooks are enabled to pass below the cylinder-needle-yarn guide.

The yarn from the cylinder-needle-yarn guide is drawn by the revolution of the cam-plate M directly between the blades of a thread-cutter, $s^2$, (see Fig. 15,) and the end of the yarn next the yarn-guide is held between the forked spring $s^3$ at the rear side of the rod $s$, with which the cutter is attached. As soon as the cylinder-needles are again worked regularly and the switch is in its highest position, the cylinder-needles, in their descent, catch the yarn of the cylinder-needle yarn guide, it being then held by the spring $s^3$, and knitting will be resumed by the cylinder-needles with the said yarn.

The key 70, Figs. 13 and 11, permits the introduction and removal of the plate-needles, and the key 71, Figs. 19 and 5, permits the introduction and removal of the cylinder-needles.

The usual support, 73, for the plate-needles, connected with the shank 74, is shown in Figs. 18 and 5.

The edges of the links 81, 41, $c^7$, and $c^8$ form cams or inclines, and I therefore denominate them "cam-links." I prefer these cam-links to stationary cams—such, for instance, as $f^4$ and $f^5$—for the reason that they occupy less space.

Instead of the particular pattern-surface herein employed, I may use any other well-known form of pattern-surface, and by change of the projections of the pattern-surface I may control the movement of the various cams and the times of shogging the needle-cylinder according to the class of work being done.

The take-up mechanism is operated by the counter or power-driven shaft B, the pulleys on which drive the main shaft and the knitting devices, which enables the strain on the main shaft to be maintained more nearly equal than were the take-up devices driven by the main shaft, as heretofore.

I claim—

1. The needle-cylinder, cylinder-needles, and cam-cylinder provided with two grooves for the reception of the butts of the said needles, and a reciprocating switch, combined with a pattern-surface, and intermediate connections between it and the said switch, whereby the switch may be moved automatically to direct the butts of the cylinder-needles into one or the other of the said grooves, substantially as described.

2. The needle-bed, plate-needles, and cam-plate having two grooves for the reception of the butts of the plate-needles, and a switch-cam, combined with a pattern-surface and intermediate connections, substantially as described, between the said pattern-surface and switch-cam, whereby the switch-cam may be moved automatically to place the butts of the needles in either of the said grooves, substantially as described.

3. The needle-bed, plate-needles, the grooved cam-plate, its attached cams and switch-cams to throw the plate-needles into and out of operation, means to rotate the cam-plate, the needle-cylinder, cylinder-needles, the grooved cam-cylinder, its cam and switch to actuate the cylinder-needles, a pattern-surface and connecting devices between the said cams, switch-cams, and switch, to operate the said needles automatically, combined with cams, and with means between the said cams and needle-cylinder to shog the needle-cylinder and cylinder-needles according to the requirements of the pattern-surface, substantially as described.

4. The needle-bed to contain the plate-needles, the plate-needles, the cam-plate, the cam 29 to draw in the needles to form loops in the yarn, and the slide-rod $a^{12}$, and means to connect it with the said cam, combined with the slide-block $a^4$ and its cams $a^5 a^6$, to operate the said slide-rod and through it the cam 29, substantially as described.

5. The needle-bed to contain the plate-needles, the plate-needles, the cam-plate, the cam 29 to draw in the needles to form loops in the yarn, the slide-rod $a^{12}$, and means to connect it with the said cam, and the slide-block $a^4$ and its attached cams, combined with the slide to move the slide-block, and pattern surface or chain to actuate the said slide, substantially as described.

6. The needle-bed, the plate-needles, the cam-plate, the needle-drawing-in cam 29, the slide-rod $a^{12}$, means to connect it with the said cam, the slide-block $a^4$, its cams $a^5 a^6$, and the slide $a$ to move it, combined with the pattern surfaces or chains and their projections, made adjustable as to their projection from the bars of the pattern-chain, to place the cams $a^5 a^6$ in the desired position, according to the length of loop desired, substantially as described.

7. The needle-bed, plate-needles, the cam-plate, its auxiliary throwing-out cam, and the connected slide-rod $b^4$, combined with the slide-block $d^4$ and cam-link 81, to move the slide-rod, and through it the said auxiliary throwing-out cam, into its position farthest away from the center of the cam-plate, substantially as described.

8. The needle-bed, plate-needles, the cam-plate, its auxiliary throwing-out cam, and the connected slide-rod $b^4$, combined with the slide-block 32 and its cam $b^7$, to move the slide-rod, and through it the auxiliary throwing-out cam, into its position nearest the center of the cam-plate, substantially as and for the purpose described.

9. The needle-bed, plate-needles, the cam-plate, its auxiliary throwing-out cam, and the connected slide-rod, combined with the slide-block $d^4$ and cam-link 81, to move the said slide-rod, and through it the auxiliary throwing-out cam, into its position farthest away from the center of the cam-plate, and with the slide $d$ for moving block $d^4$, and pattern-surface to actuate the said slide, substantially as described.

10. The needle-bed, plate-needles, the cam-plate, its auxiliary throwing-out cam, and the connected slide-rod $b^4$, combined with the slide-block 32 and its cam $b^7$, to move the slide-rod, and through it the auxiliary throwing-out cam, into its position nearest the center of the cam-plate, and with the slide $d$ for moving the block 32, and pattern-surface to actuate the said slide, substantially as described.

11. The cam-plate, the switch-cam 132, and the slide-rod $g$, combined with the slide-block $g^5$ and cams $g^3 g^4$ thereon, substantially as described.

12. The cam-plate, its switch-cam 132, the slide-rod $g$, and the slide-block $g^5$, and cams $g^3 g^4$ thereon, combined with the slide $c$ for moving block $g^5$, and pattern-surface to move the said slide, substantially as described.

13. The cam-plate, its switch-cam 31, lever 39, and the slide-rod $d^2$, combined with the slide-block $d^4$, and cam-links 81 41 thereon, substantially as described.

14. The cam-plate, the switch-cam 31, the slide-rod $d^2$, means to connect it with the said switch-cam, slide-block $d^4$, and cam-links 81 41 thereon, combined with the slide $d$ for moving the slide-block $d^4$, and pattern-surface to move the said plate, substantially as and for the purpose described.

15. The needle-cylinder, cylinder-needles, cam-cylinder, and its switch, provided with the rod 23, and the connected slide-bar $c^2$, combined with the slide-block $c^9$, and its cam-links $c^7$ $c^8$, to move the said slide-rod and through it the switch, substantially as described.

16. The needle-cylinder, cylinder-needles, cam-cylinder, its switch provided with rod 23, the slide-rod $c^2$, connected therewith, and the slide-block $c^9$ and its cam-links, combined with the slide $e$ to move the slide-block $c^9$, and pattern-surface to move the said slide, substantially as described.

17. The needle-cylinder, cylinder-needles, cam-cylinder provided with grooves $N^4$ $N^5$, and the switch between them, and means, substantially as described, to automatically place the said switch in its intermediate position, as set forth, to obviate the introduction of yarn into the hooks of the cylinder-needles, combined with the needle-bed, cam-plate, plate-needles, and cams to actuate them, whereby a separating course may be introduced, substantially as described.

18. The needle-cylinder, cylinder-needles, grooved cam-cylinder, and knitting or drawing-down cam $P^2$ and its rod 24, combined with the slide-rod $f$, the slide-block $f^5$, and its cams $f^3$ $f^4$, substantially as described.

19. The needle-cylinder, cylinder-needles, grooved cam-cylinder, and knitting or drawing-down cam $P^2$ and its rod 24, combined with the slide-rod $f$, slide-block $f^5$, and its cams $f^3$ $f^4$, combined with the slide $b$ for moving the slide-block $f^5$, and pattern-surface to actuate the same, substantially as described.

20. A guide-box, a slide-rod therein provided with teeth, a roller-stud carried by the slide-rod, a spring lifting slide, $a^{21}$, carried by the slide-rod, and its roller-stud $a^{22}$, combined with cams or inclines, substantially as described, to first move the spring lifting slide and then the slide-rod, and with the drawing-in cam, and means to connect the same with the slide-rod, substantially as and for the purpose set forth.

21. In combination, the needle-bed, plate-needles, cam-plate, its cams 29 30 and switch-cams 31 132, the needle-cylinder, cylinder-needles, cam-cylinder, its switch and knitting-cam, the slide-rods connected with the said cams, switch-cam, and switch, pattern-surfaces, and means, substantially as described, between the said slide-rods and pattern-surfaces, to actuate the said slide-rods automatically according to the requirements of the pattern-surface.

22. The needle-bed, plate-needles, cam-plate, switch-cam 31, auxiliary throwing-out cam 30, their slide-rods $d^2$ $b^4$, slide-blocks $d^4$ and cam-links 81 41, and slide $d$, combined with pattern-surfaces to actuate the slide $d$, as and for the purpose set forth.

23. The needle-bed, plate-needles, cam-plate, switch-cam 31, auxiliary throwing-out cam 30, their slide-rods $d^2$ $b^4$, slide-block $d^4$, cam links 81 41, slide $d$, and pattern-surface to actuate it, the needle-cylinder, cylinder-needles, and cam-cylinder, combined with means, substantially as described, to automatically shog the needle-cylinder and cylinder-needles while the point of the switch-cam 31 is nearest the center of the cam-plate and the point of the auxiliary cam 30 is in its position most remote from the center of the cam-plate, the plate-needles being then drawn back and holding loops of their own thread.

24. The cam-cylinder, cylinder-needles, needle-cylinder provided with dogs, and the ring 51, provided with forks 49 to engage the said dogs, combined with cams to automatically operate the said ring, and through it shog the needle-cylinder, substantially as and for the purpose described.

25. The main shaft, its small fast pulley and flange, clutch-pulley $E^8$, and means to connect it with the said flange, and the small and large loose pulleys, and the bevel-pinion $M^2$, combined with the cam-plate, and adapted to drive it at different speeds, substantially as described.

26. In combination, the main shaft, the small fast pulley and flange $E^9$, clutch-pulley $E^8$, and means to connect it with the said flange, the small and large loose pulleys $E^7$ $E^6$, pinion $M^2$, cam-plate actuated by it, belts $E^5$ $E^2$, means to move them, belt-controller $H^5$, pattern-surface, and intermediate mechanism to actuate the belt-controller from the pattern-surface, to change the speed of rotation of the cam-plate, substantially as set forth.

27. The main shaft, the clutch-pulley $E^8$, loose thereon, its extended sleeve, means to drive the said pulley while loose on the main shaft, the shaft $G^8$, means to connect it and the sleeve of the clutch-pulley $E^8$, the cams $G^6$ and $G^7$, a pawl-carrier and pawl actuated by the said cams, and a ratchet-wheel, and the shaft $G^2$, with which it is connected, combined with the shaft $F^2$, pattern surface or chain, and connections between the said two shafts, whereby the pattern-surface may be driven while the main shaft is at rest, substantially as set forth.

28. In combination, the pawl-carrier $G^3$, the cam $G^7$, means to actuate it, the forked arm 16, engaging a part of said cam, a rod to move the said arm, and pattern-surface to actuate the said rod, substantially as described.

29. The shaft $G^8$, the cam $G^7$, means to connect it with the said shaft, the pawl-carrier $G^3$, its roll 4, and the arm 16, having its hub placed loosely on the rod 17, combined with the said rod, its lug 18, spring 19, and with the pattern-surface to move the said rod, to operate substantially as described.

30. In combination, the cam-plate, its attached beveled stop J, the pin $n^5$, the lever $n^7$, connections between it and the said pin, the rod $n^8$, lever $E^{12}$, main shaft, hub $E'$ thereon, its pin 2, the flange $E^9$, and clutch-pulley $E^8$, whereby the said beveled stop, through the devices herein described, is enabled to withdraw the pin 2 from the flange to leave the main shaft at rest, substantially as and for the purpose set forth.

31. The cam-plate, the beveled stop J, the pin $n^5$, wedge or incline $n^3$ to support it, the pin $n^4$, elbow-lever $n^7$, against which the pin $n^4$ rests, and which is moved by the said pin, combined with the plunger $n$, cam to move it and the said wedge or incline, and means to actuate the said cam, the said wedge or incline being loosely connected with the said plunger, substantially as described.

32. The cam-plate, its stop J, the pin 65, and arm 63 to carry it, combined with a spring to lift the pin in front of the stop, to arrest the movement of the cam-plate, substantially as set forth.

33. The cam-plate, its stop J, the pin 65, means to move it, a cam to effect the withdrawal of the said pin at the proper time, and means to move the said cam, substantially as described.

34. The main shaft $E^4$, the cam-plate, means to actuate it, a pattern-surface, means to actuate it, and means, substantially as described, actuated by the pattern-surface, to first effect the stoppage of the main shaft and then of the cam-plate, substantially as described.

35. The bobbin support $C^2$, the detecting-lever $C'$, pivoted therein, and adapted to enter a slot in the bobbin and be held in upright position by the yarn thereon, and the rod $C^3$, combined with the frame A, the semicircular slide, the lever $B^9$, the stud $B^7$, the latch $B^6$, and the shipper-lever, substantially as and for the purpose described.

36. The counter-shaft, means to drive it, the pulleys at one end of the counter-shaft, the main shaft and means to connect it with the counter-shaft, and the take-up and means to connect it with and actuate it from the counter-shaft, substantially as and for the purpose set forth.

37. The needle-bed, plate-needles, cam-plate, and cams thereon to actuate the plate-needles, the needle-cylinder, cylinder-needles, cam-cylinder, and its cam and switch, combined with a pattern-surface and intermediate devices to actuate the said cams, and with means to rotate the said plate and cylinder, substantially as and for the purpose described.

38. In combination, the main shaft, means to operate it, the cam-plate, and intermediate connections between it and the said shaft, a stop on the cam-plate, a pulley adapted to be made fast or to run loosely with relation to the said shaft, means to move the pulley, a pattern-surface, and means between it and the said pulley to turn the pattern-surface while the main shaft is at rest, substantially as described.

39. In combination, the main shaft, means to operate it, the cam-plate, and intermediate connections between it and the said shaft, a pulley adapted to be made fast or to run loosely with relation to the said shaft, means to move the pulley, a pattern-surface, and means between it and the said pulley to turn the pattern-surface while the main shaft is at rest, a pin to engage the cam-plate, and a cam actuated by the said pattern-surface to control the times of movement of the said pin, for the purpose set forth.

40. The needle-cylinder having dogs, and the ring 51, having forks, and the arm 52, combined with cams 54 55, and with a pattern-surface to actuate the same to shog the needle-cylinder, substantially as described.

41. The cam-cylinder, cylinder-needles, needle-cylinder, cam-plate, means to move it, its yoke, and the cylinder-needle-yarn guide, and yarn-cutter attached to the said yoke, combined with the cutter to cut the yarn leading to the cylinder-needles, substantially as described.

42. That improvement in the art or method of preventing ribbed one-and-one-knitted fabric from unraveling which consists in changing the one-and-one-rib stitch to cardigan-stitch by introducing yarn from the cylinder-needle-yarn guide into the hooks of the cylinder-needles, knitting one or more courses of cardigan-stitch by means of two yarns, and drawing the yarn taken from the cylinder-needle-yarn guide into long loops while knitting the last course of cardigan, all substantially as set forth.

In testimony whereof I have signed my name to this specification in the presence of two subscribing witnesses.

GEO. A. LEIGHTON.

Witnesses:
W. H. SIGSTON,
B. J. NOYES.